Figure 5:
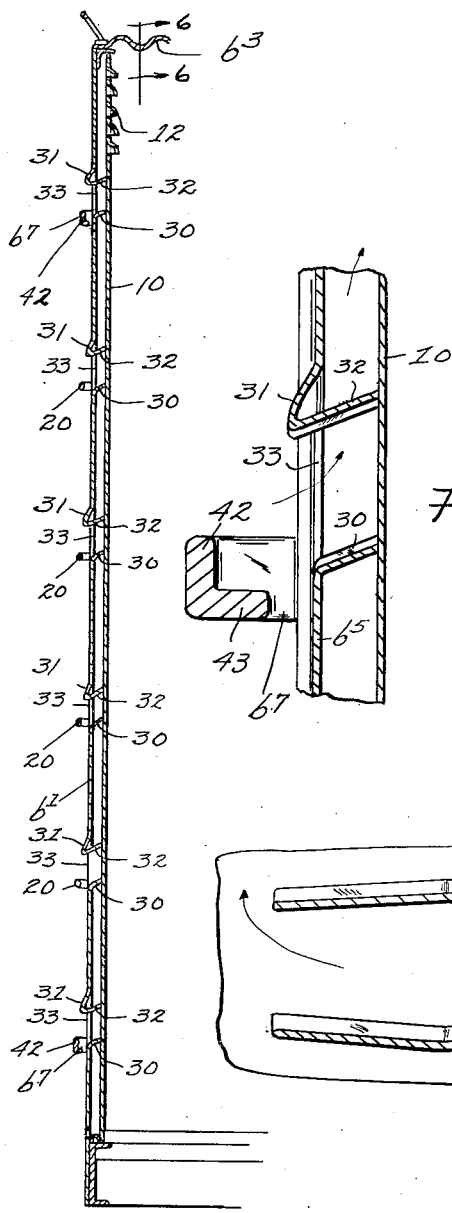

Dec. 8, 1936.                    B. F. FITCH                    2,063,033
                              DEMOUNTABLE BODY
                           Filed Aug. 31, 1933          2 Sheets-Sheet 1
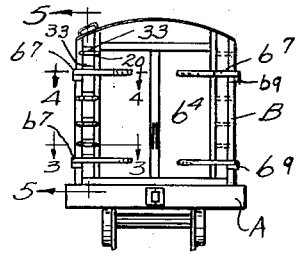
Fig.-1
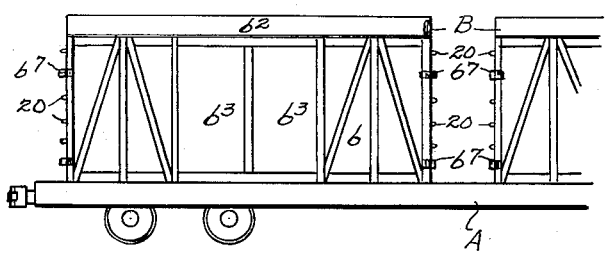
Fig.-2
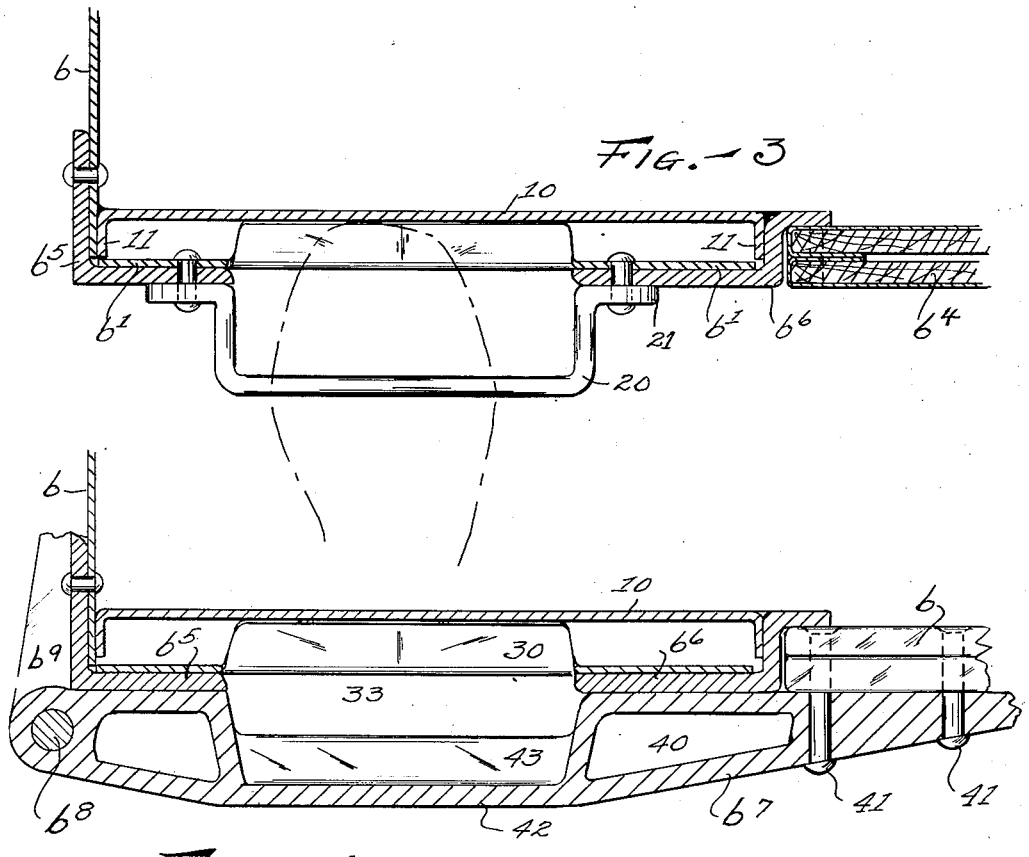
Fig.-3
Fig.-4
Inventor
Benjamin F. Fitch,
By Bates, Golrick & Teare,
Attorneys Dec. 8, 1936.  B. F. FITCH  2,063,033
DEMOUNTABLE BODY
Filed Aug. 31, 1933   2 Sheets-Sheet 2

Inventor
Benjamin F. Fitch,
By Bates, Golrick & Fears
Attorneys

Patented Dec. 8, 1936

2,063,033

UNITED STATES PATENT OFFICE 2,063,033

DEMOUNTABLE BODY

Benjamin F. Fitch, Greenwich, Conn., assignor to Motor Terminals Company, New York, N. Y., a corporation of Delaware Application August 31, 1933, Serial No. 687,664

15 Claims. (Cl. 220—1.5)

The handling of package freight by means of demountable truck bodies which may be carried on highway trucks and lifted intact with the load to or from railway flat cars for intermediate rail transportation, has many advantages, reducing the cost of shipping from consignor to consignee, reducing the time involved, and reducing the loss due to breakage or pilferage. For such a system to be most effective the demountable truck body should be as large as can be conveniently transported by a single truck on a city street, as the larger the body the less, per unit of cubic contents, is the handling expense, and the less the proportional loss from unfilled internal space.

When such large bodies are mounted on a railway flat car there is hardly room at the side of the car for a trainman to pass from end to end during transit, and it is accordingly desirable to provide means whereby the trainman may readily climb to the top of the demountable body and walk along the top. However side ladders, if inset into the side walls, use up valuable storage space within the body and if projecting at the side increase the width beyond that permissible for highway trucking, unless the entire body is correspondingly reduced in width. To place ordinary ladders at the end of the body would materially reduce the width of the doorway in the end, and if such ladders project as usual they are liable to be damaged in placing a body on a truck or in lowering a second body onto a flat car in close proximity to one already placed.

It is an object of my invention to provide a demountable body with a ladder so arranged that it shall not increase the width of the body and shall increase the length much less than an ordinary external ladder, and at the same time shall not materially reduce the internal available space for packing freight within the body. This I effect by partially insetting the space required for the operator's foot into an idle space within the body.

As demountable bodies sometimes carry perishable fruits or other contents requiring change of air, it is important that means be provided to ventilate the body. I accomplish this providing a vertical flue in an idle space back of the door adjacent the end of the body. Now in the present invention I consolidate this ventilation provision with the inset portion of the ladder space; that is to say, the ventilation openings into the flue are made available for the insertion of the foot of the operator mounting the ladder. Thus, I accomplish the double purpose of providing a flue with external openings and providing a ladder with the rungs projecting materially less than normal, thereby reducing the over-all length of the container and minimizing the liability of damage to it.

My invention comprises the combination of a ventilation flue and ladder as above outlined, and as hereinafter more fully explained in connection with the drawings, which drawings illustrate a preferred embodiment of the invention.

Figure 6:
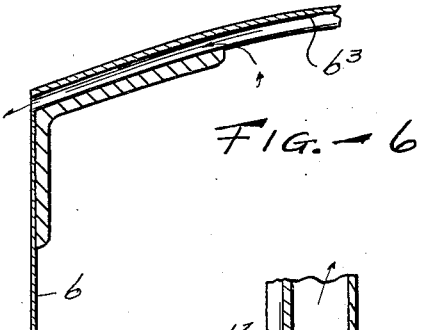
Figure 7:
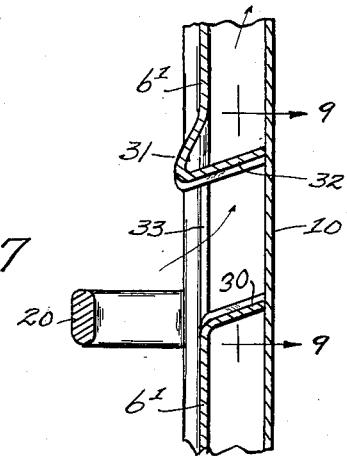
Figure 8:
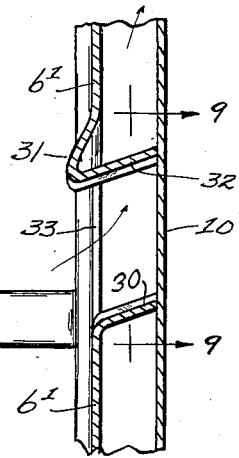
Figure 9:
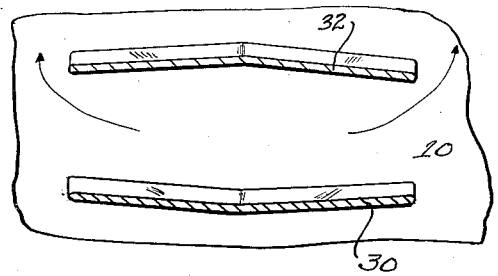

In the drawings Fig. 1 is an end view of the demountable body of this invention on a flat car; Fig. 2 is a side elevation illustrating a plurality of such bodies on a flat car; Fig. 3 is a horizontal section on line 3—3 of Fig. 1 through one of the rear corners of the body, showing the construction of the ventilation flue and ladder adjacent any of the fixed ladder rungs; Fig. 4 is a horizontal section through the same corner of the body showing a section through one of the hinge straps, as indicated by the line 4—4 on Fig. 1; Fig. 5 is a vertical section through the ventilation flue and ladder, indicated by the line 5—5 on Fig. 1; Fig. 6 is a detail illustrating the ventilation space in the roof of the demountable body, this view being a fragmentary cross-section as indicated by the line 6—6 on Fig. 5; Figs. 7 and 8 are fragmentary sectional details of the ventilation flue and ladder,— Fig. 7 being taken through one of the hinge straps and Fig. 8 through one of the rungs; Fig. 9 is a detail of the ventilation flue in the vertical section, taken on the line 9—9 in Fig. 8.

As shown in Figs. 1 and 2, "A" indicates a railway flat car. On this car is shown a demountable body B having side walls $b$ and end walls $b1$, secured to a suitable floor frame and carrying at their upper ends a roof $b2$. Suitable side doors $b3$ are shown in the side wall and end doors $b4$ within the space bounded by the narrow vertical portions of the end wall.

Describing the body shown more particularly, the side plates $b$ and end plates $b1$ are connected to vertical angle bars $b5$ leading from the floor frame to the roof. The end door-frame $b6$ comprises a member in the form of a Z-bar in cross-section, having one of its flanges secured to the outer face of the end wall $b1$, its web projecting inwardly, and its other flange projecting behind the door $b4$. This door $b4$ is shown as supported by a pair of hinged straps $b7$, secured to the door and extending to the corner of the body, where these straps are mounted on stationary vertical pins $b8$ carried by brackets $b9$ secured to the corners of the body.

The inset ladder and ventilation construction of this invention is shown in the drawings as applied to a body substantially as described. In such application, I secure a vertical plate 10, within the body, to the door jamb Z-bar $b6$ and to the side of the body, this plate being parallel with the end wall $b1$ and located a comparatively short distance behind it. As shown in Fig. 3, I have flanged the edges of the plate 10 to produce a channel shape which substantially fills the available space between the side wall and the web of the Z-bar door jamb. I have secured this channel plate by welding at its respective vertical edges.

The plate 10 rises from the floor of the body, as illustrated in Fig. 5, and extends nearly or entirely to the roof. It may terminate short of the roof, providing a discharge orifice above it, or such orifice may be formed by louvers in the plate as indicated at 12. It will be seen that with external openings through the end b1 of the body I have provided a ventilation flue which is out of the way and does not materially reduce the available storage space within the body.

The openings through the end walls of the body into the ventilation flue in this invention are made in a peculiar manner and special position, as these openings are to serve also as foot spaces for the attendant on the ladder. The ladder rungs comprise shallow bails 20 having ears 21 through which pass rivets securing them directly to the corner angle irons b5 and the Z-bar door frame b6 of the container, and the intake openings into the flue are arranged directly behind the foot space above the rungs.

Now, to make the ventilation intake openings available for the toe of the operator's shoe when he climbs the ladder rungs without endangering access of water to the interior, I form the openings with partition walls above and below them. Referring more particularly to Figs. 5, 7, 8, and 9, it will be seen that on a level below the top of the rung 20 is a portion 30 of the end plate b1, turned inwardly and diagonally upwardly against the internal vertical plate 10. Likewise a material distance above the rung is a portion of the end plate b1, which is first flared outwardly at 31 and then bent inwardly and diagonally upwardly at 32 to abut the internal plate 10.

The construction described gives open spaces 33 between the internal plate extensions 30 and 32, which provide for the toe of the operator's foot resting on any of the rungs 20, and by reason of this internal projection the rung need project a considerable less distance beyond the body wall than usual for car ladders. The external projection 31 above the opening 33 provides a rain shield to shed externally the water falling on the plate b1. The inclined plate 30 acts to receive and shed the water passing diagonally downward into the opening 33. This plate 30 is preferably sloped toward a central region, as illustrated in Fig. 9, to cause any entering water to collect in such region and be readily discharged. Should any water splash beyond the ends of the plates 30, it drops to the bottom of the flue and is discharged through the draining opening 35.

The air, entering through the openings 33, passes upwardly around the ends of the internal plate portions, as indicated by the arrows in Fig. 9, and into the body through the louvers 12 and finally out under the corrugated roof sheets, as indicated in Fig. 6. Thus, an effective ventilation is provided.

The inturned plate portions 30 and 32, above described, may readily be made integral with the end wall b1, by forming through its intermediate region parallel vertical slits the distance between which corresponds to the vertical dimension of the portion to be bent, and a cross-slit so located that there is an upwardly projecting tongue, which when bent inward forms the portion 30, and a downwardly projecting tongue which when bent outward and then inward forms the portions 31 and 32.

The construction described provides for ladder steps in a convenient location in the region between the hinge straps b7 and also preferably above the upper strap. To prevent the hinge straps interfering with the continuity of the ladder, I so arrange the construction that each strap is located in the position which would naturally be apportioned to a ladder rung, and I form the strap so that it may take the place of such rung. As there is no occasion for an attendant to use the ladder except when the doors are closed, I thus have a continuous regularly spaced ladder from the floor to the top of the container.

To give the hinge strap b7 the necessary strength and at the same time cause the intermediate portion thereof to take the place of a ladder rung, I may make it in the form of a hollow steel casting 40 illustrated in horizontal section in Fig. 4. This casting for the most part lies tight against the door b4 to which it is secured by rivets 41, and when the doors are closed it lies also against the corner angle iron b5 and the Z-bar door jamb b6, as illustrated in Fig. 4.

Directly opposite the ventilation opening 33, the casting 40 has a vertical web 42 some distance back from the plain of the body and a horizontal stiffening web 43. This gives the necessary strength in this region and at the same time provides a step for the operator substantially corresponding in position and extent to the rung 42; that is to say, the operator steps on the upper edge of the web 42 in exactly the same manner as on the rungs 20.

The heavy hinge straps also act as a protection for the ladder rungs, since the straps project beyond the face of the end wall a distance corresponding to the rungs, and thus prevent the rungs being bent if one body is shifted longitudinally into engagement with the other, or if the body strikes a wall or post while being transferred between a truck and car. The hinge straps in such instances act as effective bumpers relieving the rungs from distorting blows.

It will be seen from the description given that I have provided the demountable body with a combined ventilation flue and ladder which uses internal space normally idle and requires materially less external space than a usual externally applied ladder. Moreover, the continuity of the ladder is not interrupted by the hinge straps, and the hinge straps function to protect the ladder. The provision for intake of air in the flue is effected without danger of troublesome water entering it. The air makes a continuous draft into the flue, thence into the top of the body and out through the roof carrying with it any vapours rising from the contents of the container. The back plate of the ventilation flue is also useful in bracing the body and particularly the door jamb thereof.

I claim:

1. A demountable automobile body having an internal ventilation flue communicating with the interior of the body, said flue having intake openings from the exterior of the body, an external ladder, the rungs of the ladder registering with said intake openings for admission of the toe of the operator's foot resting on the rung.

2. A demountable automobile body having a doorway in its end some distance from the edge, a ventilation flue within the body between the doorway and side and communicating with the interior of the body, uniformly arranged openings through the end wall of the body into the ventilation flue, ladder rungs secured to the exterior of the body having their tops in registration with said openings.

3. A demountable automobile body having a side wall and end wall and an inwardly projecting door jamb in the end wall, a vertical plate extending from the side wall to the door jamb some distance back from the end of the body, whereby a vertical flue is provided, uniformly arranged openings through the end wall into the flue, a passageway from the flue into the interior of the body, and external ladder rungs secured to the body and registering in position with said openings.

4. A demountable automobile body having a metal side and end and a vertical angle beam at the corner and a Z-bar door jamb constituting part of the end, ladder rungs each in the form of a shallow bail having its ends secured to the transverse flanges of the angle beam and Z-bar, openings through an intermediate region of the end wall in registration with the tops of the rungs, a vertical plate behind the openings connected at its edges with the door jamb and body side, whereby a ventilation flue is provided, and a passageway from said flue to the interior of the body.

5. A demountable automobile body having a doorway in its end, spaced from the corner, a ventilation flue between the wall and the door of the body communicating with the interior of the body, openings into the ventilation flue and inwardly projecting plate portions at the bottoms of the respective openings, and ladder rungs secured to the body on its exterior and registering in position with the openings.

6. A demountable automobile body having an external wall and a vertical plate parallel with the wall some distance behind it, forming a flue communicating with the interior of the body, openings through the wall into the flue thus provided, and plate-like portions formed of the material of the wall bent inwardly into the flue to provide a weather protection.

7. A demountable automobile body having a wall, a vertical plate positioned behind the wall to provide a flue between them, openings through the plate and wall into the flue, a plate portion extending diagonally upwardly from the wall substantially to the back of the flue, said plate portion sloping toward an intermediate region to concentrate and discharge entering water.

8. A demountable automobile body having external walls, an internal plate substantially parallel with one of the walls to provide a flue between them, and communicating with the interior of the body, openings through the latter wall into the flue, each opening being bounded above and below by an inturned portion of the wall reaching from the wall substantially to the back of the flue, said inturned portions having their lateral ends terminating short of the lateral ends of the flue.

9. A demountable automobile body having a metal side and end and a vertical angle beam at the corner and a Z-bar door jamb constituting part of the end, a ladder rung secured to the transverse flanges of the angle beam and Z-bar, openings through an intermediate region of the end wall in registration with the tops of the rungs, an internal vertical shallow channel member having its web parallel with the wall and its flanges substantially abutting and secured to the body side and to the web of the Z-bar to provide a vertical internal flue, and a passageway from said flue to the interior of the body.

10. A demountable automobile body, a doorway in its end of less width than the body, a ladder of substantial width at the end located between the doorway and corner of the body, said ladder having periodically arranged rungs of substantially equal spacing, and a hinge strap for the door extending across the ladder region and positioned below a rung a distance substantially corresponding to the spacing of the rungs.

11. A demountable body having a doorway spaced from the edge of the body, an external ladder on the body in the space between the doorway and said edge, said ladder having substantially equidistantly arranged rungs and hinge straps secured to the door and extending across the space between the door and corner of the body, said hinge straps being so positioned that they take the position of two of the latter rungs and preserve the continuity of the ladder.

12. A freight container having a doorway spaced from the corner, a door, hinge straps secured to the door extending across the intervening space and pivoted adjacent the corner of the container, a ladder carried by the container wall in the region between the doorway and corner of the container, said ladder having substantially equally spaced rungs and the hinge straps being located in the same spacing with reference to the rungs so that they may take the place of rungs without interrupting the continuity of the ladder.

13. The combination of a container having a wall and doorway, hinge straps secured to a door adapted to seat in the doorway and mounted on hinge pins spaced from the edge of the door, a ladder having rungs arranged in a vertical row in such intervening region, the intermediate portion of the hinge strap being formed with a web located a distance from the wall substantially corresponding to the distance of the rungs from such wall, whereby said strips may take the place of rungs.

14. The combination of a container having a wall and doorway, hinge straps secured to a door adapted to seat in the doorway and mounted on hinge pins spaced from the edge of the door, a ladder having rungs arranged in a vertical row in such intervening region, the hinge straps being spaced from the adjacent rungs a distance corresponding to the spacing of the rungs, and the intermediate portion of the strap being formed with a web located a distance from the wall substantially corresponding to the distance of the rungs from each wall, a ventilation flue within the container in the region behind the ladder and communicating with the interior of the container, and openings into said flue spaced to correspond with the rungs and hinge straps whereby the attendant standing on a rung or a hinge strap may have the toe of his shoe enter the ventilation space.

15. A demountable automobile body having an internal partition which coacts with a wall of the body to provide a vertical flue between them, a passageway from said flue to the interior of the body, an external ladder secured to the body in the region opposite the flue, and uniformly positioned openings through the wall of the body into the flue in registration with the tops of the ladder rungs, whereby there is provided both a foot space for the user of the ladder and intake openings into the flue.

BENJAMIN F. FITCH.